Figure 1:
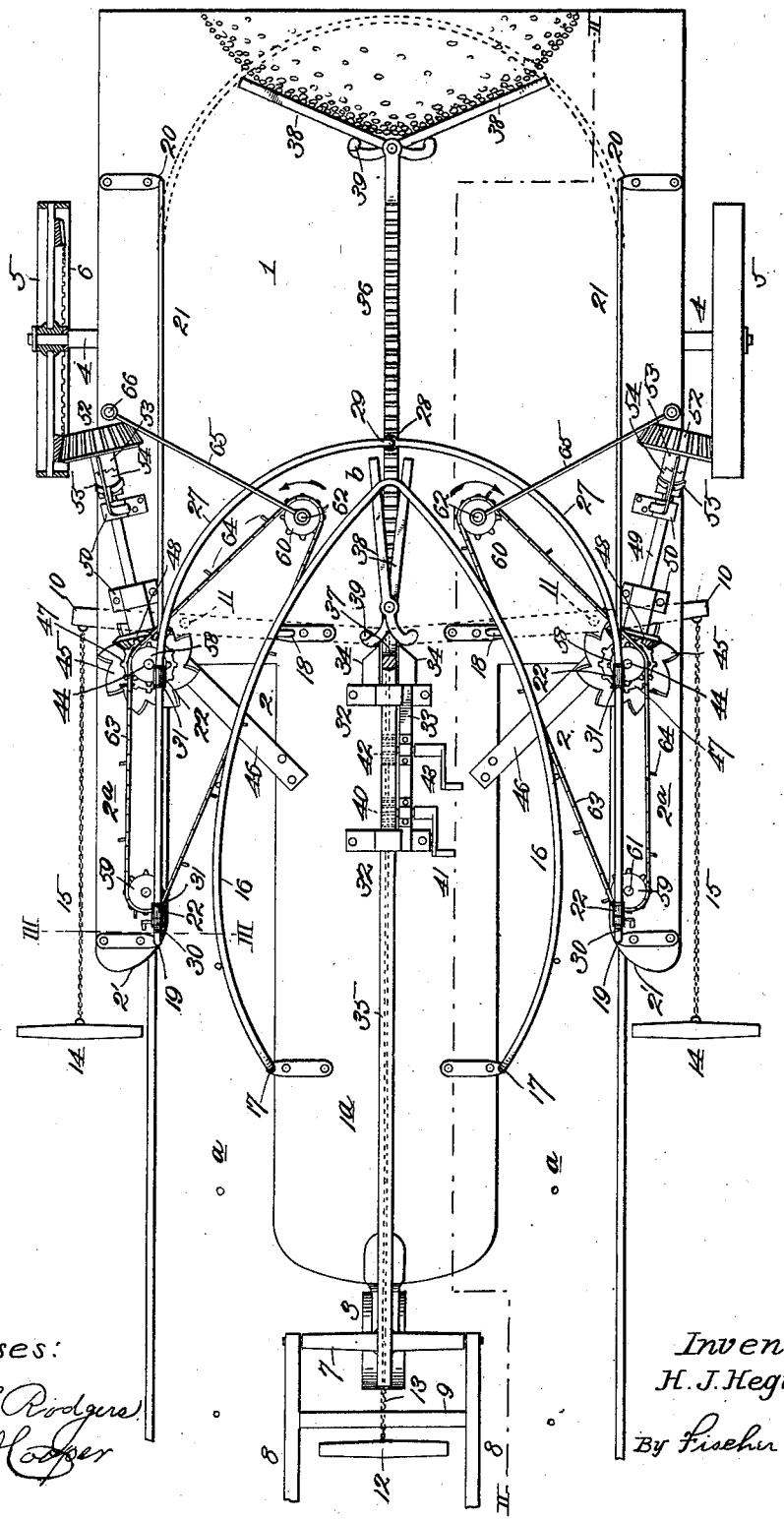

No. 666,140. Patented Jan. 15, 1901.
H. J. HEGWER.
CORN HARVESTER AND SHOCKER.
(Application filed June 23, 1900.)

(No Model.) 2 Sheets—Sheet 1.

Witnesses:
H. C. Rodgers
A. Hooper

Inventor:
H. J. Hegwer
By Fischer & Thorpe
Attys.

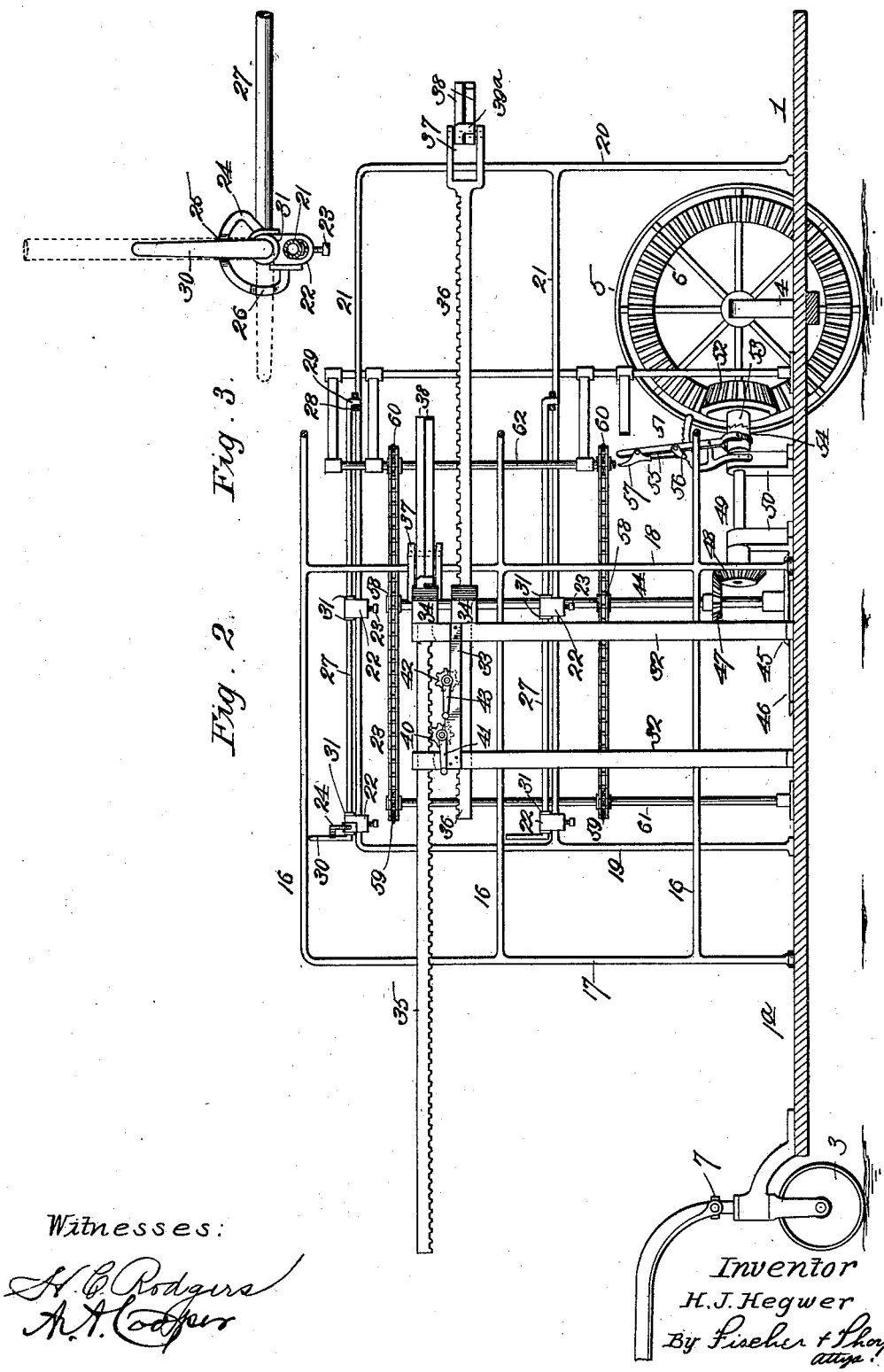

UNITED STATES PATENT OFFICE.

HERMAN J. HEGWER, OF COTTONWOOD FALLS, KANSAS.

CORN HARVESTER AND SHOCKER.

SPECIFICATION forming part of Letters Patent No. 666,140, dated January 15, 1901.

Application filed June 23, 1900. Serial No. 21,273. (No model.)

*To all whom it may concern:*

Be it known that I, HERMAN J. HEGWER, a citizen of the United States, and a resident of Cottonwood Falls, Chase county, State of Kansas, have invented a new and useful Corn Harvester and Shocker, of which the following is a specification.

My invention relates to corn harvesters and shockers; and my object is to produce a machine of this character which can be operated by one man, is rapid and efficient, and which embodies the advantageous features of simplicity, strength, durability, and cheapness of construction.

With this object in view the invention consists in certain novel and peculiar features of construction and combinations of parts, as hereinafter described and claimed, and in order that it may be fully understood reference is to be had to the accompanying drawings, in which—

Figure 1 is a top plan view of a machine embodying my invention. Fig. 2 is a vertical section taken on the line II II of Fig. 1. Fig. 3 is an enlarged cross-section of one of the parallel tracks and shows a front view of one section of the sliding cradle mounted thereon, said section being taken on the dotted line III III of Fig. 1.

Referring to the drawings in detail, 1 designates a low-down horizontal platform provided with the forwardly-projecting parallel portions $1^a$ and $2^a$, so as to form between them forwardly-opening recesses 2 in line with the growing corn, as indicated at $a$, the central portion or tongue $1^a$ being of greater dimensions than the side portions $2^a$, which latter are curved, as at $2'$, to facilitate the entrance of corn growing out of line into recesses 2. The front end of tongue $1^a$ is swiveled upon a caster 3, and the body portion of the platform rests upon the depressed portion of the drop-axle 4, the carrying-wheels 5, journaled upon the ends of said axle, being provided with large bevel gear-wheels 6 at their inner sides.

Mounted upon the upper end of the caster-standard is a cross-bar 7, and pivoted thereon are the thills or shafts 8, connected by cross-bar 9. A three-horse evener consists of the levers 10, pivoted to the under side of the platform nearer their outer than their inner ends, as at 11, the singletree 12, chained, as at 13, to the inner ends of said levers, and the singletrees 14, chained, as at 15, to the outer ends of said levers, the arrangement being such that the central horse, which is pulling against the outside horses, has a double leverage upon each. As a result the labor is equalized on the animals.

16 designates two series of curved bars which are preferably formed by bending wire rods at their centers. These bars are arranged vertically one above the other at each side and overhang the recesses 2, so as to form arcs of which the parallel sides of the tongue $1^a$ form the chords. The points of one set of said bars most remote from the corresponding points of the other are about in the center of said recess, and therefore in longitudinal alinement with the adjacent rows of corn, and from said points they curve inward, so that in conjunction with the curved ends $2'$ of the platform they shall form flaring mouths to insure the proper entrance of the corn, and from the same point said bars converge rearward and meet, by preference, at a point midway between the sides of the machine and some distance rearward of said recesses. Said guide-bars 16 preferably occupy horizontal planes and are carried by the vertical standards 17 and 18, secured, respectively, to the tongue $1^a$ and the body portion of the platform.

A guide and supporting frame comprises the vertical standards 19, erected upon the front ends of the platform portions $2^a$, the corresponding standards 20, erected upon the body portion of the platform near its rear end, and the parallel tracks 21, connecting said standards, there being preferably two tracks at each side, and mounted upon each track, opposite recesses 2, is a pair of collars 22, provided with set-screws 23, for a purpose which hereinafter appears. The front collars are provided with sectors 24, having vertical and horizontal notches 25 and 26, said sectors extending at right angles to the tracks.

A cradle or shock-forming frame consists of two sets of rods 27, one above the other, each set consisting of two rods disposed longitudinally of the machine in the same horizontal plane and consisting of a straight front portion and a curved or quadrant-shaped rear portion, one of the rear portions of each set terminating in an eye 28 and the other in a pin 29, detachably interlocking with said eyes. The straight or front portions of said U-shaped cradle are journaled in the collars 22 above tracks 21 and at their front ends terminate in upwardly-projecting arms or levers 30, normally engaging notches 25 of the sectors 24, but adapted to be swung downward to a position at right angles to the vertical and be engaged with notches 26 of said sectors. By said action they rotate the sections of the cradle upwardly and outwardly, thereby effecting the disconnection of eyes 28 with pins 29, and hold said sections with their curved ends projecting vertically upward, as shown in dotted lines, Fig. 3. The object of this manipulation of the cradle or shock-forming frame is hereinafter explained, and in order to prevent the same from slipping longitudinally in collars 22 the straight portions are provided with rigid collars or enlargements 31, bearing against opposite ends of collars 22.

Mounted centrally upon the rear end of tongue 1ª is a pair of parallel standards 32, connected near their upper ends by a bar 33, and projecting rearward from the rearmost standard 32 is a series of wedge-blocks 34, one set being located in the plane of bar 33 and the other set preferably above said bar. A pair of longitudinally-extending horizontal rack-bars 35 and 36 are mounted in the upper ends of standards 32 and between the wedge-blocks, rack-bar 35 having its teeth downwardly disposed and arranged between the wedge-blocks forming the upper set, while rack-bar 36 has its teeth upwardly disposed and is arranged between the wedge-blocks of the lower set. Said rack-bars are horizontally bifurcated at their rear ends, as at 37, and each carries in its bifurcated end a shock-forming plunger consisting of a pair of intersecting bars 38, pivoted to each other and to the rear ends of the rack-bars at their points of intersection. Forward of said pivotal points the lower bar terminates in an upwardly-projecting lug 39 and the upper bar terminates in a depending lug 39ª, said lugs being adapted to bear against the opposing sides of the companion bars to limit the expansive or opening movement of the plunger, as shown clearly in Fig. 1. In the actual operation one of these plungers usually occupies its extreme forward position at the moment the other occupies its extreme rearward position, as shown clearly in Fig. 1. The plungers when moving forward are collapsed or closed by contact with the corn to the position shown in Fig. 1, and as they engage the wedge-blocks 34 they are partially opened or expanded, so as to be ready for their next rearward movement, as is hereinafter more particularly referred to. To effect the reciprocatory movement of said rack-bars, I provide cog-pinion 40, provided with a handle 41, and cog-pinion 42, provided with a handle 43, the shafts of said pinions being journaled on bar 33, with the pinion 40 engaging rack-bar 35 and pinion 42 engaging rack-bar 36.

44 designates vertical shafts journaled upon the platform at the outer corners of recesses 2, and 45 rotary knives mounted rigidly thereon just above the stationary oblique knives 46, secured upon the platform, projecting forwardly from the outer corners or recesses 2 to the tongue 1ª. Said shafts are provided with the bevel-gears 47, meshing with the gears 48, mounted upon shafts 49, journaled in standards 50, secured to the platform and carrying sectors 51. Bevel-gears 52 mesh with and are driven by master-gears 6 and are journaled upon shafts 49, and in order that the latter may be rotated when desired said gears 52 are provided with clutch-sections 53, adapted to be engaged by the companion clutch-sections 54, mounted to slide upon and rotate with shafts 49. Levers 55, pivoted on the sector-arms 51 and to said slidable clutch-sections, are provided with dogs 56 to engage the sectors and grip-levers 57, connected to said dogs for the purpose of withdrawing the latter from engagement with the sectors when desired.

At suitable points shafts 44 are provided with sprocket-wheels 58, arranged in the same horizontal plane as the similar sprocket-wheels 59 and 60, the former being journaled upon the standards or shafts 61, near the front ends of platform portions 2ª, and the latter upon shafts 62, rearward and inward of recesses 2 and within the U-shaped cradle. Connecting said sprocket-wheels is an endless conveyer comprising chains 63, provided with outwardly-projecting pins 64, that portion of the chains extending from the sprockets 59 to sprockets 60 converging rearwardly with and by preference underlying part of the curved guide-bars 16, said portions of the chains diverging with relation to the rear ends of said guide-bars, and in order to prevent corn being carried around by the conveyer and outward, as indicated by the arrows, Fig. 1, I provide a series of guard or deflecting bars 65, connecting shafts 62 with the vertical standards 66, erected upon the platform outward of guide-bars 21 and rearward of bevel-gears 52.

In practice it is obvious that the rotation of the carrying-wheels 5 imparts continuous motion to the rotary knives 45 and the endless chains 63 as long as the clutches are in operative relation.

Assuming now that the machine is traveling across the field, as indicated in Fig. 1, it will be noticed that the corn first comes in contact with the curved guide-bars 16 and is then engaged by the pins 64 of the intersecting and rearwardly-moving portions of the conveyers and is forced thereby against the stationary knives or blades 46, which in most cases completely cut the corn. In some cases, perhaps, conditions will be such that the corn will press said parts of the chain outwardly and slide along the edge of the knife without becoming totally severed until it comes within the sphere of the rotary knives, which will instantly and reliably complete the cut. The severed stalks being pressed by the chain against the parallel guide-bars 16 are held in a substantially vertical position before and after being cut and after the cutting operation are conveyed in the same position rearwardly and discharged in a standing position against the rear or curved end of the U-shaped cradle or shock-forming frame. Should one of the stalks stick to the chain, it will be knocked off by the deflectors 65 and, being confined in the space represented by $b$, cannot topple over, but is held upright within the cradle. As the operation continues the corn accumulates in space $b$ to such an extent that the operator grasps the handle of the at this time advanced rack-bar and forces it rearward, this action by the resistance of the corn which has accumulated between the plunger-arms causing the plunger to expand partially and slide the cradle rearwardly upon tracks 21, the set-screws 23 binding on the tracks with sufficient friction only to prevent the weight of the corn itself from pushing the cradle rearward. As the now-enlarged space $b$ again fills up the operator forces the said plunger rearward again, and consequently enlarges the space $b$ by a corresponding movement on the part of the cradle. Eventually the cradle assumes a position substantially as shown in dotted lines, Fig. 1, by which time the plunger is totally expanded and a large shock is standing upon the rear end of the platform. The driver now stops the machine and ties the shock in the usual manner. He then grasps handles 30 (see Fig. 3) and throws them from the position shown in full to the position shown in dotted lines, and thereby partially operates and disengages the sections of the cradle from the shock. He then slides said sections forwardly until they can again be brought to the horizontal and interlocked position without interfering with the shock, after which he pushes the cradle forward until it has attained its original position, as shown in full lines, Fig. 1. He then starts the machine up again, and as the corn is automatically cut and deposited in a vertical position within the cradle he operates the proper handle and moves the expanded plunger rearward until it has pushed the shock off the rear end of the platform, and as the platform is so close to the ground the shock is dropped thereon in a standing position. He then reverses the operation of said handle and moves the expanded plunger forward, and as it reaches the space $b$ in which the corn is accumulating the pressure of such corn effects its collapse. Should a stalk or two of corn get between the front ends of the plunger, the attendant can easily push them out, so that as the collapsed plunger reaches the forward end of its movement and engages wedge-blocks 34 it is re-expanded slightly, so as to be ready for the next rearward movement, and in this connection it might be stated that while I have shown two rack-bars and plungers the machine can be operated satisfactorily with only one set of these devices. The remaining operations are repetitions of the ones described.

From the above description it will be apparent that I have produced a corn harvester and shocker which embodies the features of advantage enumerated as desirable in the statement of invention and which may be susceptible of various modifications as regards the form, proportion, arrangement, and detail construction of the parts without departing from the spirit or scope or sacrificing any of the advantages of the invention.

Having thus described the invention, what I claim as new, and desire to secure by Letters Patent, is—

1. In a machine of the character described, a wheeled frame, guide-tracks mounted thereon, and a cradle, comprising collars mounted slidingly upon said tracks, the front collars being formed with notched sectors, and two arms or sections journaled in said collars and detachably interlocked at their rear or meeting ends, and each provided at its front end with a crank to engage one notch or the other of the corresponding collar-sector, substantially as and for the purpose described.

2. In a machine of the character described, a wheeled frame, guide-tracks mounted thereon, a cradle, comprising collars mounted slidingly upon said tracks, the front collars being formed with notched sectors, and two arms or sections journaled in said collars and detachably interlocked at their rear or meeting ends, and each provided at its front end with a crank to engage one notch or the other of the corresponding collar-sector, and means to longitudinally reciprocate the cradle, in whole or in part, substantially as described.

3. In a machine of the character described, a wheeled frame, guide-tracks mounted thereon, a cradle, comprising collars mounted slidingly upon said tracks, the front collars being formed with notched sectors, and two arms or sections journaled in said collars and detachably interlocked at their rear or meeting ends, and each provided with a crank to engage one notch or the other of the corresponding collar-sector, means to longitudinally reciprocate the cradle, in whole or in part, a guide and an endless conveyer carried by the machine and arranged near their front ends to receive and engage the growing corn, and at their rear ends to discharge the harvested corn into the cradle in an upright position, a cutting mechanism below said guide and conveyer, mounted on the machine and adapted to sever the corn forced against it by the conveyer, and a guard extending outwardly from the rear end of the conveyer to intercept and thereby prevent the corn delivered into the cradle from being drawn forward by the conveyer, substantially as described.

4. In a machine of the character described, a wheeled frame, a movable cradle to receive and support the harvested corn in an upright position, a plunger to engage the corn in the cradle, a rack-bar extending forwardly from the plunger, a guide-frame for the said rack-bar, a cog-wheel engaging the rack-bar and journaled upon said frame, and a handle for operating said cog-wheel, substantially as described.

5. In a machine of the character described, a wheeled frame, a cradle supporting the harvested corn in an upright position, a reciprocatory bar, a plunger carried at the rear end of said bar, consisting of arms pivoted together and to the bar and having their front ends formed with lugs, said lugs being adapted to engage the companion bar and limit the expansive movement of the plunger, means to reciprocate the plunger-carrying bar, a guide-arm carrying the reciprocatory bar, and a wedge entering the space between the front ends of the plunger-arms to reëxpand said plunger when it reaches the forward limit of its movement, substantially as described.

In testimony whereof I affix my signature in the presence of two witnesses.

HERMAN J. HEGWER.

Witnesses:
ELMER JOHNSTON,
E. B. JOHNSTON.